United States Patent
Zhu et al.

(10) Patent No.: US 10,318,323 B2
(45) Date of Patent: Jun. 11, 2019

(54) INTERFERENCE-BASED CLIENT PLACEMENT USING DYNAMIC WEIGHTS

(71) Applicant: VMware, Inc., Palo Alto, CA (US)

(72) Inventors: Xiaoyun Zhu, Cupertino, CA (US); Madhuri Yechuri, Palo Alto, CA (US); Kalyan Saladi, Sunnyvale, CA (US); Sahan Gamage, Redwood City, CA (US); Puneet Zaroo, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 568 days.

(21) Appl. No.: 14/754,409

(22) Filed: Jun. 29, 2015

(65) Prior Publication Data
US 2016/0380907 A1 Dec. 29, 2016

(51) Int. Cl.
*G06F 9/50* (2006.01)
*G06F 9/455* (2018.01)
*H04L 29/08* (2006.01)

(52) U.S. Cl.
CPC ............ *G06F 9/45533* (2013.01); *G06F 9/50* (2013.01); *H04L 67/1008* (2013.01)

(58) Field of Classification Search
CPC ..................................................... H04L 47/70
See application file for complete search history.

(56) References Cited

U.S. PATENT DOCUMENTS

| | | |
|---|---|---|
| 2011/0173327 A1 | 7/2011 | Chen et al. |
| 2011/0225299 A1 | 9/2011 | Nathuji et al. |
| 2012/0023492 A1* | 1/2012 | Govindan ............ G06F 9/5083 718/1 |
| 2014/0059207 A1* | 2/2014 | Gulati .................... G06F 9/505 709/224 |
| 2014/0082201 A1 | 3/2014 | Shankari et al. |

OTHER PUBLICATIONS

C. Delimitrou et al.; "iBench: Quantifying Interference for Datacenter Applications"; In Proceedings of the IEEE International Symposium on Workload Characterization (IISWC), Sep. 2013.

C. Delimitrou et al.: "Paragon: QoS-Aware Scheduling for Heterogeneous Datacenters"; In Proceedings of the 18th International Conference on Architectural Support for Programming Languages and Operating Systems (ASPLOS), Mar. 2013.

(Continued)

*Primary Examiner* — Vivek Srivastava
*Assistant Examiner* — Nicholas P Celani
(74) *Attorney, Agent, or Firm* — Loza & Loza, LLP (57) ABSTRACT

A management server and method for performing resource management operations in a distributed computer system utilizes interference scores for clients executing different workloads, including a client to be placed in the distributed computer system, as utilization values of resources, which are assigned continuously variable weights to produce weighted resource utilization values. The weighted resource utilization values are used to generate overall selection scores for host computers of the distributed compute system, which are then used to recommend a target host computer among the host computers of the distributed computer system to place the client.

21 Claims, 5 Drawing Sheets

(56) References Cited

OTHER PUBLICATIONS

S. Govindan et al.; "Cuanta: Quantifying Effects of Shared On-chip Resource Interference for Consolidated Virtual Machines"; In ACM Symposium on Cloud Computing (SOCC), Oct. 2011.

A. Gulati et al.; "PARDA: Proportional Allocation of Resources for Distributed Storage Access"; In Proceedings of the 7th Conference on File and Storage Technologies, pp. 85-98, Berkeley, CA, USA, 2009, USENIX Association.

A. Gulati et al.; "VMware Distributed Resource Management: Design, Implementation and Lessons Learned"; 2013.

A. Gulati et al.; "BASIL: Automated IO Load Balancing Across Storage Devices"; In Proceedings of the 8th USENIX Conference on File and Storage Technologies, FAST'10, Berkeley, CA, USA, 2010, USENIX Association.

M. Kesavan et al.; "dWeights: Taming the Multi-Headed Monster for VM Placement in the Cloud"; In submitted to RADIO 2012, 2012.

S.-H. Lim et al.; "D-Factor: A Quantitative Model of Application Slow-Down in Multi-Resource Shared Systems"; In 12th ACM SIGMETRICS/Performance Joint International Conference on Measurement and Modeling of Computer Systems, Jun. 2012.

R. Nathuji et al.; "Q-Clouds: Managing Performance Interference Effects for QoS-Aware Clouds"; In Eurosys, Apr. 2010.

A. Roytman et al.; "PACMan: Performance Aware Virtual Machine Consolidation"; In International Conference on Autonomic Computing (ICAC), Jun. 2013.

C. A. Waldspurger; "Memory Resource Management in VMware ESX Server"; In Proceedings of the 5th Symposium on Operating Systems Design and Implementation, pp. 181-194, New York, NY, USA, 2002, ACM Press.

R. West et al.; "Online Cache Modeling for Commodity Multicore Processors"; SIGOPS Oper. Syst. Rev., 44(4):Dec. 19-29, 2010.

X. Zhang et al.; "CPI2: CPU performance isolation for shared compute clusters"; In SIGOPS European Conference on Computer Systems (EuroSys), pp. 379-391, Prague, Czech Republic, 2013.

\* cited by examiner

INTERFERENCE-BASED CLIENT PLACEMENT USING DYNAMIC WEIGHTS

BACKGROUND

Workload consolidation is one of the fundamental underpinnings of cloud computing, enabling the provider to realize reductions in infrastructure and energy costs and to achieve economies of scale. Consolidation needs to be balanced against the obvious concerns of isolation, not just limited to security, but performance and quality of service (QoS) as well. Thus, placement of clients performing the different workloads, such as virtual machines (VMs), in a physical infrastructure is an important factor in efficiently utilizing the physical resources. An effective client placement strategy must meet the requirements of the clients and optimize several, sometimes conflicting, goals, while taking into consideration the complexities of the physical infrastructure.

Even after the clients have been properly placed in the physical infrastructure, some of these clients may have to be moved or migrated to different hosts for various reasons, such as load balancing or removing hot spots. Thus, the selection of appropriate hosts to which the clients will be migrated is an important resource management process.

When making client placement decisions, including client migration decisions, various parameters are considered in making the decisions. Some of the parameters considered relate to resource controls of the clients, such as reservation, limit and share values. However, the parameters currently considered in making client placement decisions may not produce the desired results, for example, with respect to application performance and service level agreements (SLAs).

SUMMARY

A management server and method for performing resource management operations in a distributed computer system utilizes interference scores for clients executing different workloads, including a client to be placed in the distributed computer system, as utilization values of resources, which are assigned continuously variable weights to produce weighted resource utilization values. The weighted resource utilization values are used to generate overall selection scores for host computers of the distributed compute system, which are then used to recommend a target host computer among the host computers of the distributed computer system to place the client.

A method for performing resource management operations in a distributed computer system in accordance with an embodiment of the invention comprises obtaining interference scores for clients executing different workloads for each host computer of the distributed computer system, including a client to be placed in the distributed computer system, to be used as utilization values of resources for that host computer, assigning continuously variable weights to the utilization values to produce weighted resource utilization values, generating overall selection scores for host computers of the distributed compute system using the weighted resource utilization values for the host computers, and recommending a target host computer among the host computers of the distributed computer system to place the client using the overall selection scores of the host computers. In some embodiments, the steps of this method are performed when program instructions contained in a computer-readable storage medium are executed by one or more processors.

A management server in accordance with an embodiment of the invention comprises a client placement engine configured to recommend a target host computer among host computers of the distributed computer system to place a client using overall selection scores of the host computers. The client placement engine comprises a selection score generator and an overall selection score generator. The selection score generator is configured to obtain interference scores for clients executing different workloads for each host computer of the distributed computer system, including a client to be placed in the distributed computer system, to be used as utilization values of resources for that host computer. The selection score generator is further configured to assign continuously variable weights to the utilization values to produce weighted resource utilization values. The overall score generator is configured to generate the overall selection scores for the host computers using the weighted resource utilization values for the host computers.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
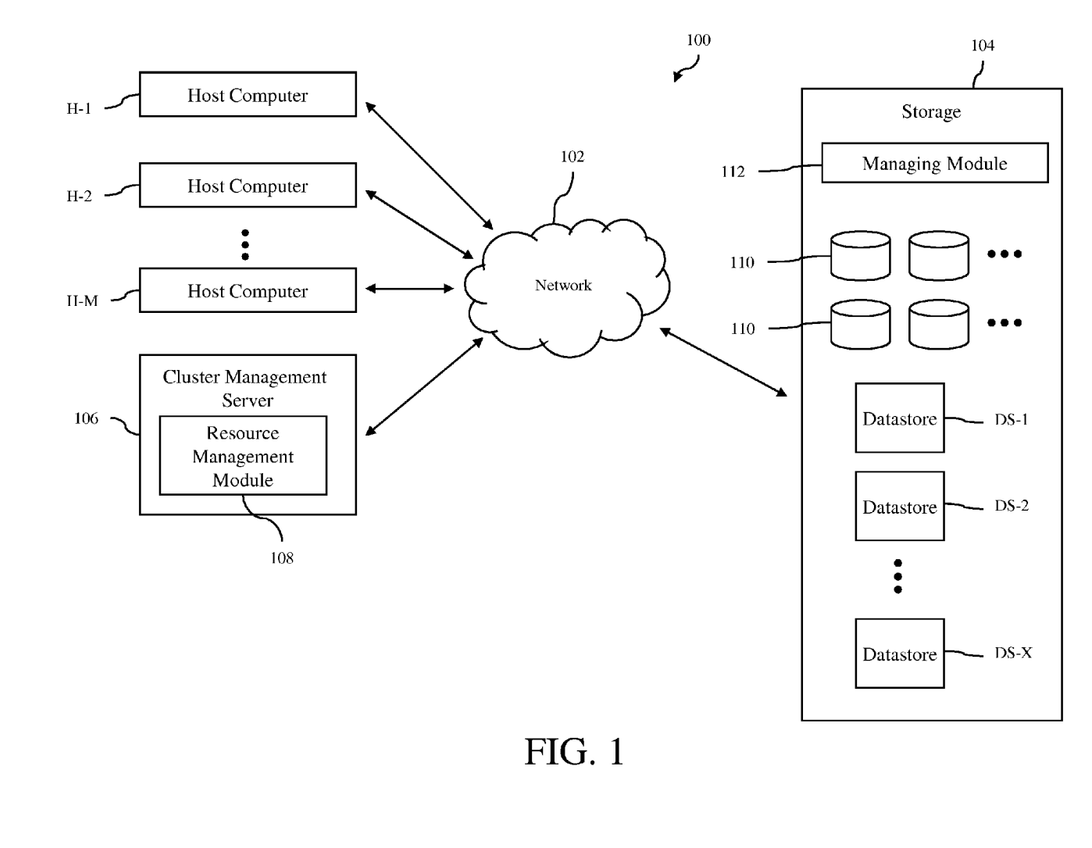
FIG. 1 is a block diagram of a distributed computer system in accordance with an embodiment of the invention.

Turning now to FIG. 1, a distributed computer system 100 in accordance with an embodiment of the invention is shown. As illustrated in FIG. 1, the distributed computer system includes a network 102, a cluster of host computers H-1, H-2 . . . H-M (where M is a positive integer), storage 104 and a cluster management server 106 with a resource management module 108. The host computers, the storage and the cluster management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that host or support one or more clients so that the clients are executing on the physical computer systems. As used herein, the term "client" is any software entity that can run on a computer system, such as a software application, a software process, a virtual machine (VM) and a "container" that provides system-level process isolation. The host computers may be servers that are commonly found in datacenters. As an example, the host computers may be servers installed in a single server rack. However, in other embodiments, the host computers may be installed in multiple server racks in the same or different facilities.

Figure 2:
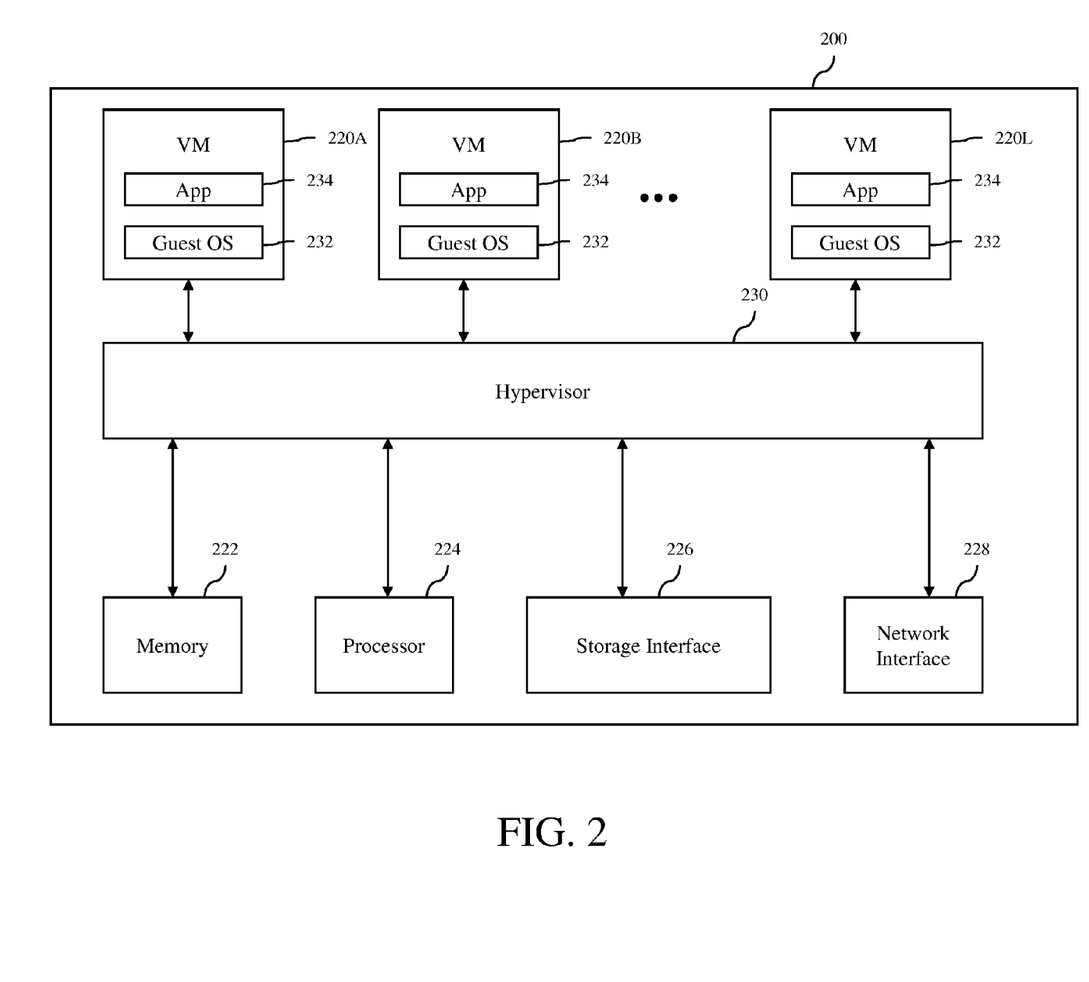
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer and the resource requirements of the VMs. The VMs share at least some of the hardware resources of the host computer, which include one or more system memories 222, one or more processors 224, one or more storage interfaces 226, and one or more network interfaces 228. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by the hypervisor, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-M. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cluster management server 106 operates to monitor and manage the host computers H-1, H-2 . . . H-M. The cluster management server may be configured to monitor the current configurations of the host computers and the clients running on the host computers, for example, virtual machines (VMs). The monitored configurations may include hardware configuration of each of the host computers, such as CPU type, multi-processor memory architecture and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, i.e., virtualized hardware configuration of each of the clients, such as virtual CPU type, number of virtual CPUs, virtual memory size, and virtual storage size, as well as software configuration of each of the clients, such as OS type and installed applications or software programs running on each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers or the hypervisors hosting the clients by monitoring the current usage of resources by the clients, e.g., CPU processing usage, memory usage, network usage and/or storage usage, and provided to the cluster management server.

The cluster management server 106 may also perform operations to manage the clients and the host computers H-1, H-2 . . . H-M in the cluster. As illustrated in FIG. 1, in an embodiment, the cluster management server includes the resource management module 108, which can be enabled by a user, to perform various resource management operations for the cluster, including client placement operations for either initial client placement and/or load balancing. As described in more detail below, the resource management module operates to perform at least some of the resource management operations, including resource management decisions, based on resource usage contentions or interferences between clients during workload executions. When executing different workloads, clients may contend for resources, such as CPU and memory, which can adversely affect the performance of the clients. For example, with the advent of multicore processors, multiple virtual machines (VMs) scheduled on the same multicore CPU contend for the last-level cache and memory bandwidth. The VMs can slow each other down by evicting each other's data cached in the last-level cache and by contending for the memory bandwidth. A workload issuing random input/output (IO) requests can adversely affect the performance of another workload issuing sequential IOs, as the access pattern visible on the shared storage effectively becomes random.

In some embodiments, the cluster management server 106 may be a physical computer. In other embodiments, the cluster management server may be implemented as one or more software programs running on one or more physical computers, such as the host computer 200 shown in FIG. 2, or virtual computers, such as the 220A, 220B . . . 220L. In an implementation, the cluster management server is a VMware vCenter™ Server with at least some of the features available for such a server, and the resource management module 108 in the cluster management server is VMware vSphere® Distributed Resource Scheduler™.

Figure 3:
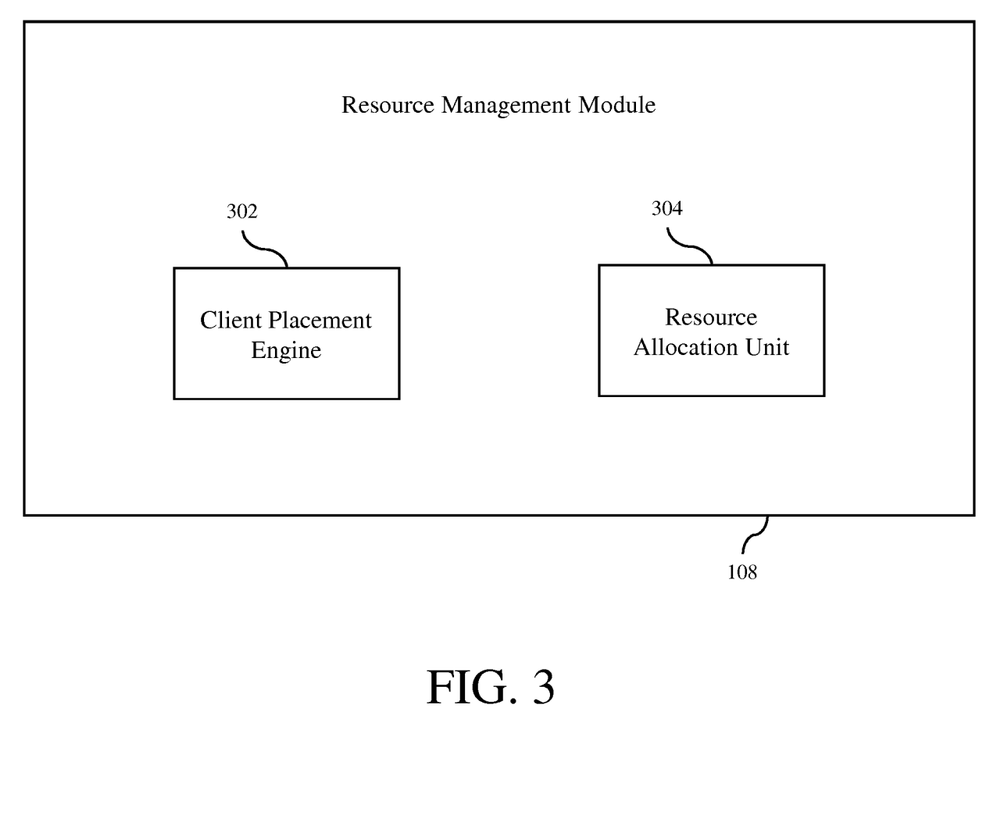
FIG. 3 is a block diagram of a resource management module included in the distributed computer system in accordance with an embodiment of the invention.

Turning now to FIG. 3, components of the resource management module 108 in accordance with an embodiment of the invention are shown. As illustrated in FIG. 3, the resource management module includes a client placement engine 302. As described in more detail below, the client placement engine operates to make client placement decisions with consideration of utilizations of the host computers, resource requirements of the clients, as well as interferences between clients to execute their respective operations. The client placement engine is described in detail below. The resource management module further includes other components commonly found in a cluster management server, such as a resource allocation unit 304 that distributes resources to various components in the cluster, such as clients and host computers, using various parameters such as reservation, limit and share values. Since the resource allocation unit is a commonly found element, it is not described herein in detail. In a particular implementation, the resource allocation unit may be a component found in VMware vSphere® Distributed Resource Scheduler™. The components of the resource management module may be implemented in any combination of hardware, software and firmware. In one implementation, these components of the resource management module are implemented as one or more software programs running in the cluster management server 106 using one or more processors associated with the cluster management server.

Figure 4:
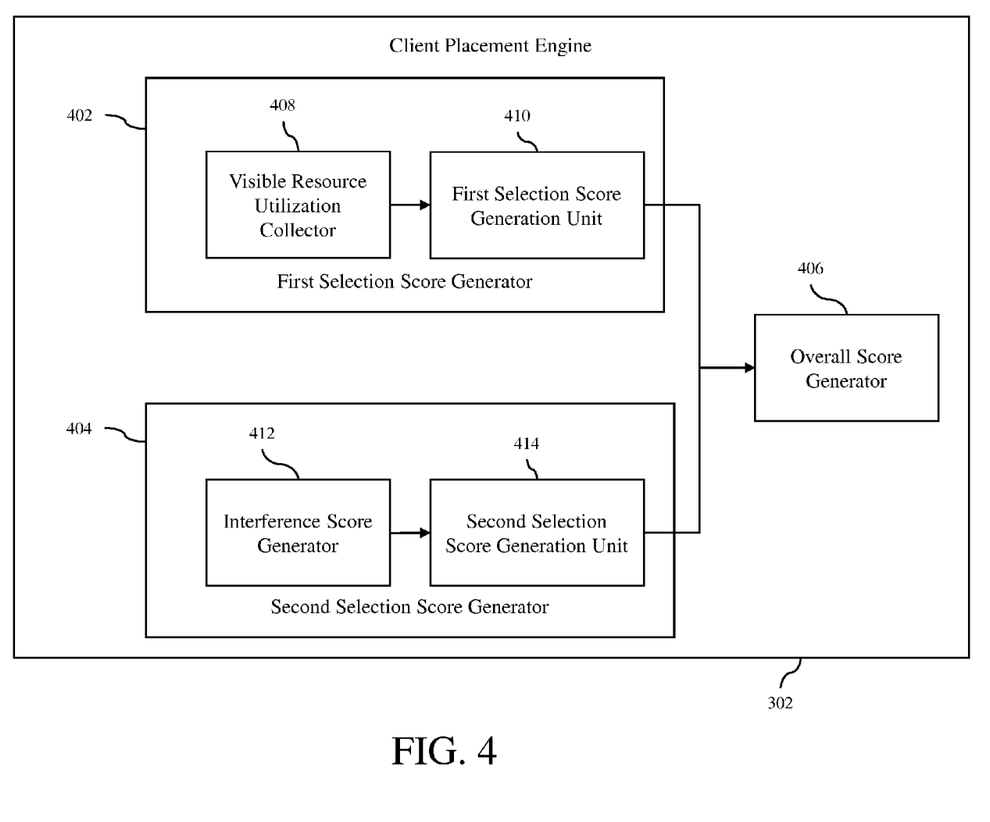
FIG. 4 is a block diagram of a client placement engine included in the resource management module in accordance with an embodiment of the invention.

Turning now to FIG. 4, components of the client placement engine 302 in accordance with an embodiment of the invention are shown. As illustrated in FIG. 4, the client placement engine includes a first selection score generator 402, a second selection score generator 404 and an overall selection score generator 406. The first selection score generator operates to generate a selection score for each host computer in the distributed computer system 100 based on visible resources being utilized at that host computer. As used herein, visible resources are computer resources that are commonly measured with respect to their utilization in a cluster of computers hosting virtual machines for resource management, such as the cluster of host computers H-1, H-2 . . . H-M in the distributed computer system 100. As an example, the visible resources may include, but not limited to, CPU and memory. The second selection score generator operates to generate a selection score for each host computer in the distributed computer system 100 based on invisible resources being utilized at that host computer. As used herein, invisible resources are computer resources that are commonly not measured with respect to their utilization in a cluster of computers hosting virtual machines for resource management, such as the cluster of host computers H-1, H-2 . . . H-M in the distributed computer system 100. As an example, the invisible resources may include, but not limited to, cache and memory bandwidth. As explained below, the measurements of the invisible resources utilizations are based on interference scores of clients, which may be running on the host computers, that represent contentions between clients for common shared resources. Thus, the selection scores based on invisible resources includes consideration of performance interference between the clients.

The overall selection score generator operates to generate an overall selection score for each host computer using the first and second selection scores for that host computer. The overall selection score is then used by the client placement engine to recommend a target host computer to place a client for either initial placement or load balancing.

As illustrated in FIG. 4, the first selection generator 402 of the client placement engine 302 includes a visible resource utilization collector 408 and a first selection score generation unit 410. These components of the first selection score generator can be implemented in any combination of hardware, software and firmware. In a particular implementation, the components of the first selection score generator are one or more software programs running in the cluster management server 106 as part of the resource management module 108, which may be VMware vSphere® Distributed Resource Scheduler™.

The visible resource utilization collector 408 operates to obtain visible resource utilization values for the host computers H-1, H-2 ... H-M in the cluster in which a client can be placed. It is assumed here that all the host computers in the cluster are suitable to host the client being placed, i.e., each host computer satisfies all the placement requirements of the client such as resource requirements (e.g., CPU and memory). Thus, each of the host computers in the cluster is a potential placement target to place the client. However, if not all the host computers are suitable to host the client being placed, the host computers may first be filtered to determine which of the host computers in the cluster are suitable to host the client so that the unsuitable host computers are not considered as potential placement targets to place the client. The visible resource utilization values may be generated and provided by the various suitable host computers. Alternatively, the visible resource utilization values may be generated by the resource management module 108 using various performance metrics, which may be provided by the host computers.

The first selection score generation unit 410 operates to generate a selection score based on the visible resource utilization for each host computer in the distributed computer system 100 using the visible resource utilization values from the visible resource utilization collector 408. For each suitable host computer, the first selection score generation unit assigns a dynamic weight to each of the visible resource utilization values (i.e., multiplies each visible resource utilization value by a dynamic weight) and sums the weighted values to derive a first selection score for that host computer. The visible resource utilization values may be first normalized to a range from zero to one, where one represents maximum or upper bound utilization and zero represents minimum utilization.

The operation of the first selection score generation unit 410 to generate a selection score based on visible resource utilization for each host computer in the distributed computer system 100 is now described in detail. In this description, all the host computers in the distributed computer system are considered to be placement targets for a client being placed. For each host computer h, a value $u_r^h$ is defined to be the aggregate utilization value of resource r, where $r \in R_v$, and $R_v$ is the set of all visible resources. For example $R_v$ may be a set that includes visible resources of CPU and memory, or $R_v = \{cpu, mem\}$. The values $u_r^h$ for visible resources may be normalized values. In addition, a vector $u_v^h$ is defined to be the utilization vector for all the visible resources on the host computer h. The first selection score $f_v$ for each host computer is then computed as follows:

$$f_v(u_v^h) = \Sigma_r^{R_v} \omega_r \times u_r^h,$$

where $\omega_r$ is the dynamic weight assigned to each visible resource r. These dynamic weights for the visible resources being considered provide a way to change the relative importance of the different resources. In an embodiment, the dynamic weights $\omega_r$ are continuously variable weights that are defined by one or more continuous functions. As used herein, a continuous function is a function that changes continuously as a variable of the function changes. As an example, for a continuous variable function of x, the function changes continuously as the value of x changes. In an embodiment, these weights are derived from a family of non-linear convex functions of the form $$\alpha \times \left(\frac{1}{1 - u_r}\right)^\beta,$$

where $\alpha$ and $\beta$ are positive values or numbers and $u_r$ is the utilization value of a particular resource. These functions give greater importance to the dominant resource, but at low utilizations, allow other resources to also play a role in the selection. In a particular implementation, each dynamic weight $\omega_r$ is computed as $$\left(\frac{1}{1 - u_r}\right)$$

so that the weights are smaller for the resources with lower utilization levels.

The second selection score generator 404 of the client placement engine 302 includes an interference score generator 412 and a second selection score generation unit 414. These components of the second selection score generator can be implemented in any combination of hardware, software and firmware. In a particular implementation, the components of the second selection score generator are one or more software programs running in the cluster management server 106 as part of the resource management module 108, which may be VMware vSphere® Distributed Resource Scheduler™.

The interference score generation unit 412 operates to generate interference scores of different shared resources for hypothetically placing a client on a specific host computer in a distributed computer system, such as the distributed computer system 100, accounting for all the shared invisible resources. As an example, these workloads may be workloads found in a typical datacenter. These interference scores quantify contentions for a shared resource among clients running different workloads.

In an embodiment, the interference score generation unit 412 may use a collection of micro-benchmarks to quantify interference among workloads. The individual benchmarks are created to stress each of identified invisible resource as the sources of interference (SoIs), such as L3 cache, memory bandwidth, storage bandwidth, network bandwidth, translation lookahead buffer (TLB), floating point unit (FPU), processor-interconnect, etc. In order to generate the interference scores, these benchmarks may be run standalone on representative servers and their performance data may be recorded. Subsequently, candidate workloads are run alongside each of these benchmarks to derive the interference scores or caused interference scores (CISs), each of which quantifies the pressure placed on a shared resource by the workload running inside a client, such as a VM. Each CIS can be represented as:

$$CIS_{i,r} = 1 - \frac{BMScore_{t,r}}{BMScore_{a,r}},$$

where $BMScore_{t,r}$ is the performance score of the workload when running together with the particular benchmark stressing resource r, and $BMScore_{a,r}$ is the performance score of the workload when running alone.

In order to derive CIS values for new workload, the interference score generation unit 412 may use a matrix factorization technique called singular value decomposition (SVD), which is commonly used for data analysis and dimension reduction. Each new workload is profiled together with two of the micro-benchmarks from the collection for a short interval, as described in a paper by C. Delimitrou and C. Kozyrakis, titled "*Paragon: QoS-Aware scheduling for heterogeneous datacenters*." The interference scores measured get added to a matrix of resources and workloads. Existing workloads and their resource-specific interference scores form the basis of the matrix to which the incoming scores are added. SVD is used to extract the hidden relationships between workloads and resource-specific interference scores. With this approach, unknown CIS values of an incoming workload can be estimated using the information from previously profiled workloads.

In a particular implementation, the interference score generation unit 412 may generate the interference scores using Paragon-based analysis. However, in other implementations, the interference score generation unit may use other approaches to generate the interference scores.

In the illustrated embodiment, the interference score generation unit 412 is part of the client placement engine 302, and thus, is part of the resource management module 108. However, in other embodiments, the interference score generation unit may be an external component that is separate and independent from the resource management module. In these embodiments, the interference score generation unit may transmit the interference scores to the resource management module to be used by other components of the resource management module.

The second selection score generation unit 414 operates to generate a selection score based on invisible resource "utilization" for each host computer in the distributed computer system 100 using the interference scores, such as caused interference scores (CISs), from the interference score generation unit 412. Since the interference scores are based on performance of clients running workloads, the interference scores represent utilization of resources. Thus, the inference scores for invisible resources can be used as utilization values for the invisible resources. Similar to the first selection score generation unit 410, for each suitable host computer, the second selection score generation unit assigns a dynamic weight to each of the invisible resource utilization values (i.e., multiplies each invisible resource utilization value by a dynamic weight) and sums the weighted values to derive a second selection score based on invisible resource utilization for that host computer. Since the invisible resource utilization values, i.e., the interference scores, may be larger than 1 for some host computers, these values may be normalized by the maximum value in the cluster such that all the utilization values are less than or equal to 1.

The operation of the second selection score generation unit 414 to generate a selection score based on invisible resource utilization for each host computer in the distributed computer system 100 is now described in detail. In this description, all the host computers in the distributed computer system are considered to be placement targets for a client being placed and the clients are virtual machines (VMs). Let $R_{inv}$ represent the set of invisible resources being considered. For example $R_{inv}$ may be a set that includes invisible resources of cache and memory bandwidth, or $R_{inv}$={cache,mem_bandwidth}. For each host computer h and each invisible resource r∈$R_{inv}$, there is a CIS for each VM i, if this VM is to be placed on that host computer. Similar to CPU utilization, a utilization value for an invisible resource can be computed as an aggregate CIS from all the VMs including the new client being placed as follows:

$$u_r^h = \Sigma_i CIS(h,i,r).$$

Since these invisible resource utilization values may be larger than 1 for some host computers, these values may be normalized by the maximum value in the cluster such that all $u_r^h$ values are less than or equal 1. The values $u_r^h$ for invisible resources may be normalized values. In addition, a vector $u_{inv}^h$ is defined to be the utilization vector for all the invisible resources on the host computer h. The second selection score $f_{inv}$ for each host computer is then computed as follows:

$$f_{inv}(u_{inv}^h) = \Sigma_r^{R_{inv}} \omega_r \times u_r^h,$$

where $\omega_r$ is the dynamic weight assigned to the invisible resource r. Similar to the first selection score $f_v$, these dynamic weights for the invisible resources being considered provide a way to change the relative importance of the different invisible resources. In an embodiment, the dynamic weights $\omega_r$ used to compute the second selection score $f_{inv}$ may be similar to the dynamic weights $\omega_r$ used to compute the first selection score $f_v$. Thus, the dynamic weights $\omega_r$ used to compute the second selection score $f_{inv}$ may be continuously variable weights that are defined by one or more continuous functions. In an embodiment, these weights may be derived from a family of non-linear convex functions of the form $$\alpha \times \left(\frac{1}{1-u_r}\right)^\beta,$$

where α and β are values or numbers greater than zero and $u_r$ is the utilization of a particular invisible resource. In a particular implementation, each dynamic weight $\omega_r$ used to compute the second selection score $f_{inv}$ may be computed as $$\left(\frac{1}{1-u_r}\right)$$

so that the weights are smaller for the invisible resources with lower utilization levels.

The overall selection score generator 406 of the client placement engine 302 operates to generate an overall selection score for each host computer using the first selection score for that host computer generated by the first selection score generator 402 and the second selection score for that host computer generated by the second selection score generator 404. The overall selection score generator may generate the overall selection score for a particular host computer by simply combining the first selection score for that host computer with the second selection score for that host computer. In an embodiment, the overall selection score generator generates the overall selection score f(h) for each host computer h as follows:

$$f(h)=(1-\alpha)f_v^h+\alpha f_{inv}^h,$$

where α is a coefficient having a value between 0 and 1, $f_v^h$ is the first selection score for the host computer h and $f_{inv}^h$ is the second selection score for the host computer h. The coefficient α provides a way to adjust the importance of the invisible resources relative to the visible resources. For example, the coefficient α can be set to 0.5 (α=0.5) to give both equal importance or set to 0.2 (α=0.2) to give more emphasis to the visible resources.

The overall selection scores for the different host computers H-1, H-2 . . . H-M in the distributed computer system 100 are then used by the client placement engine 302 to recommend a host computer to place a client for either initial placement or for load balancing. In an embodiment, the host computer with the lowest overall selection score is selected as the recommended host computer to place a client for initial placement or for load balancing.

After a placement recommendation for a client has been made by the client placement engine 302, the client can be manually or automatically placed in the recommended host computer for initial placement or for load balancing. Whether the client is automatically placed may depend on the user setting of the resource management module 108. If the resource management module is set to a manual placement setting, the recommended host computer determined by the client placement engine can be presented to the user so that the user can manually place the client in that host computer. If the resource management module is set to an automatic placement setting, the client is automatically placed in the recommended host computer. The process of placing a client, such as a VM, in a host computer (or migrating the client to a host computer in the case of load balancing) is well known and thus, is not described herein.

Figure 5:
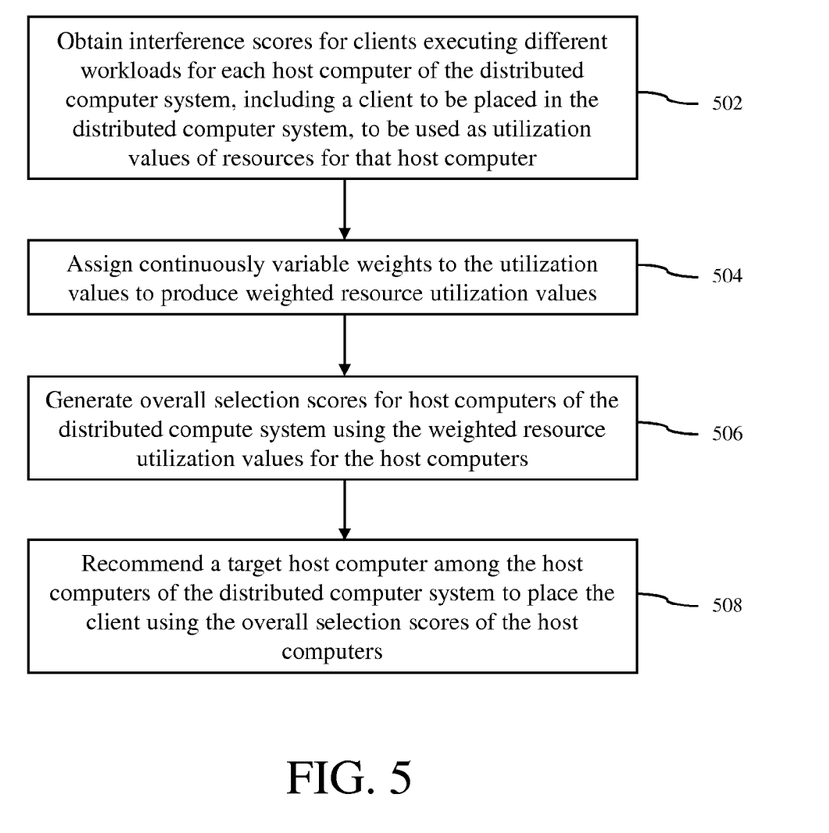
FIG. 5 is a flow diagram of a method for performing resource management operations in a distributed computer system in accordance with an embodiment of the invention.

A method for performing resource management operations in a distributed computer system in accordance with an embodiment of the invention is described with reference to a flow diagram of FIG. 5. At block 502, interference scores for clients executing different workloads for each host computer of the distributed computer system, including a client to be placed in the distributed computer system, are obtained to be used as utilization values of resources for that host computer. At block 504, continuously variable weights are assigned to the utilization values to produce weighted resource utilization values. At block 506, overall selection scores are generated for the host computers of the distributed computer system using the weighted resource utilization values for the host computers. At block 508, a target host computer among the host computers of the distributed computer system is recommended to place the client using the overall selection scores of the host computers.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing resource management operations in a distributed computer system, the method comprising:

obtaining interference scores for clients executing different workloads for each host computer of the distributed computer system, including a client to be placed in the distributed computer system;

for each host computer of the distributed computer system, aggregating the interference scores of the clients on that host computer, including the client to be placed, to produce a utilization value for that host computer;

assigning continuously variable weights to the utilization values for host computers of the distributed computer system to produce weighted resource utilization values;

generating overall selection scores for the host computers of the distributed compute system using the weighted resource utilization values for the host computers, including combining first selection scores with second selection scores to derive the overall selection scores, wherein the first selection scores are derived from weighted resource utilization values for a set of visible resources, wherein the second selection scores are derived from the weighted resource utilization values for a set of invisible resources, and wherein an overall section score for each host computer is a first selection score for that host computer times a first coefficient and a second selection score for that host computer times a second coefficient, where the first coefficient plus the second coefficient equals one; and recommending a target host computer among the host computers of the distributed computer system to place the client using the overall selection scores of the host computers.

2. The method of claim 1, wherein the obtaining the interference scores includes generating caused interference scores (CISs), each of which quantifies pressure placed on a shared resource by workload running inside an individual client.

3. The method of claim 1, wherein the assigning the continuously variable weights includes assigning the continuously variable weights using at least the following function:

$$\alpha \times \left(\frac{1}{1-u_r}\right)^\beta,$$

where $\alpha$ and $\beta$ are values greater than zero and $u_r$ is a utilization value of a particular resource.

4. The method of claim 3, wherein each of the continuously variable weights is computed as $$\left(\frac{1}{1-u_r}\right).$$

5. The method of claim 1, further comprising normalizing the resource utilization values prior to the assigning of the continuously variable weights to the resource utilization values.

6. The method of claim 1, wherein the set of invisible resources includes cache and memory bandwidth resources and wherein the set of visible resources includes processor and memory resources.

7. The method of claim 1, wherein the combining first selection scores and second selection scores to derive the overall selection scores includes using the following equation to derive the overall selection scores:

$f(h)=(1-\alpha)f_v^h+\alpha f_{inv}^h,$ where f(h) is an overall selection score for a host computer h, $f_v^h$ is a first selection score for the host computer h, $f_{inv}^h$ is a second selection score for the host computer h, and $\alpha$ is a coefficient having a value between 0 and 1.

8. The method of claim 7, wherein the second selection scores are derived using the following equation:

$f_{inv}(u_{inv}^h)=\Sigma_r^{R_{inv}}\omega_r \times u_r^h,$ where a vector $u_{inv}^h$ is defined to be a utilization vector for all the invisible resources $R_{inv}$ on the host computer h, $\omega_r$ is a dynamic weight assigned to an invisible resource r.

9. The method of claim 8, wherein a utilization value for an invisible resource can be computed as an aggregate caused interference score (CIS) from all clients including a new client being placed as follows:

$u_r^h=\Sigma_i CIS(h,i,r).$ where i is a client, r is the invisible resource and h is the host computer.

10. A non-transitory computer-readable storage medium containing program instructions for performing resource management operations in a distributed computer system, wherein execution of the program instructions by one or more processors of a computer system causes the one or more processors to perform steps comprising:

obtaining interference scores for clients executing different workloads for each host computer of the distributed computer system, including a client to be placed in the distributed computer system;

for each host computer of the distributed computer system, aggregating the interference scores of the clients on that host computer, including the client to be placed, to produce a utilization value for that host computer;

assigning continuously variable weights to the utilization values for host computers of the distributed computer system to produce weighted resource utilization values;

generating overall selection scores for the host computers of the distributed compute system using the weighted resource utilization values for the host computers, including combining first selection scores with second selection scores to derive the overall selection scores, wherein the first selection scores are derived from weighted resource utilization values for a set of visible resources, wherein the second selection scores are derived from the weighted resource utilization values for a set of invisible resources, and wherein an overall section score for each host computer is a first selection score for that host computer times a first coefficient and a second selection score for that host computer times a second coefficient, where the first coefficient plus the second coefficient equals one; and recommending a target host computer among the host computers of the distributed computer system to place the client using the overall selection scores of the host computers.

11. The computer-readable storage medium of claim 10, wherein the obtaining the interference scores includes generating caused interference scores (CISs), each of which quantifies pressure placed on a shared resource by workload running inside an individual client.

12. The computer-readable storage medium of claim 10, wherein the assigning the continuously variable weights includes assigning the continuously variable weights using at least the following function:

$$\alpha \times \left(\frac{1}{1-u_r}\right)^\beta,$$

where $\alpha$ and $\beta$ are values greater than zero and $u_r$ is a utilization value of a particular resource.

13. The computer-readable storage medium of claim 12, wherein each of the continuously variable weights is computed as $$\left(\frac{1}{1-u_r}\right).$$

14. The computer-readable storage medium of claim 10, wherein the steps further comprise normalizing the resource utilization values prior to the assigning of the continuously variable weights to the resource utilization values.

15. The computer-readable storage medium of claim 10, wherein the set of invisible resources includes cache and memory bandwidth resources and wherein the set of visible resources includes processor and memory resources.

16. The computer-readable storage medium of claim 10, wherein the combining first selection scores and second selection scores to derive the overall selection scores includes using the following equation to derive the overall selection scores:

$$f(h)=(1-\alpha)f_v^h+\alpha f_{inv}^h,$$

where f(h) is an overall selection score for a host computer h, $f_v^h$ is a first selection score for the host computer h, $f_{inv}^h$ is a second selection score for the host computer h, and α is a coefficient having a value between 0 and 1.

17. The computer-readable storage medium of claim 16, wherein the second selection scores are derived using the following equation:

$$f_{inv}(u_{inv}^h)=\Sigma_r^{R_{inv}} \omega_r \times u_r^h,$$

where a vector $u_{inv}^h$ is defined to be a utilization vector for all the invisible resources $R_{inv}$ on the host computer h, $\omega_r$ is a dynamic weight assigned to an invisible resource r.

18. The computer-readable storage medium of claim 17, wherein a utilization value for an invisible resource can be computed as an aggregate caused interference score (CIS) from all clients including a new client being placed as follows:

$$u_r^h=\Sigma_i CIS(h,i,r),$$

where i is a client, r is the invisible resource and h is the host computer.

19. A management server for a distributed computer system comprising:
memory; and
a processor configured to:
 obtain interference scores for clients executing different workloads for each host computer of the distributed computer system, including a client to be placed in the distributed computer system;
 for each host computer of the distributed computer system, aggregate the interference scores of the clients on that host computer, including the client to be placed, to produce a utilization value for that host computer;
 assign continuously variable weights to the utilization values for host computers of the distributed computer system to produce weighted resource utilization values;
 generate overall selection scores for the host computers using the weighted resource utilization values for the host computers, including combining first selection scores with second selection scores to derive the overall selection scores, wherein the first selection scores are derived from weighted resource utilization values for a set of visible resources, wherein the second selection scores are derived from the weighted resource utilization values for a set of invisible resources, and wherein an overall section score for each host computer is a first selection score for that host computer times a first coefficient and a second selection score for that host computer times a second coefficient, where the first coefficient plus the second coefficient equals one; and
 recommend a target host computer among the host computers of the distributed computer system to place the client using overall selection scores of the host computers.

20. The management server of claim 19, wherein the processor is configured to assign the continuously variable weights using at least the following function:

$$\alpha \times \left(\frac{1}{1-u_r}\right)^\beta,$$

where α and β are values greater than zero and $u_r$ is a utilization value of a particular resource.

21. The management server of claim 19, wherein the processor-is configured to combine the first selection scores and the second selection scores using the following equation to derive the overall selection scores:

$$f(h)=(1-\alpha)f_v^h+\alpha f_{inv}^h,$$

where f(h) is an overall selection score for a host computer h, $f_v^h$ is a first selection score for the host computer h, $f_{inv}^h$ is a second selection score for the host computer h, and α is a coefficient having a value between 0 and 1.

* * * * *